(12) United States Patent
Song et al.

(10) Patent No.: US 11,568,396 B2
(45) Date of Patent: Jan. 31, 2023

(54) METHOD FOR USING AND REVOKING AUTHENTICATION INFORMATION AND BLOCKCHAIN-BASED SERVER USING THE SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: COINPLUG, INC., Gyeonggi (KR)

( * ) Notice: Subject to any disclaimer, the term of this patent is extended or adjusted under 35 U.S.C. 154(b) by 1191 days.

(21) Appl. No.: 15/487,597

(22) Filed: Apr. 14, 2017

(65) Prior Publication Data

US 2017/0330180 A1    Nov. 16, 2017

(30) Foreign Application Priority Data

May 16, 2016    (KR) .......................... 10-2016-0059851

(51) Int. Cl.
| | |
|---|---|
| *G06Q 20/38* | (2012.01) |
| *G06Q 20/10* | (2012.01) |
| *G06Q 20/40* | (2012.01) |
| *G06F 16/22* | (2019.01) |
| *G06F 21/33* | (2013.01) |

(52) U.S. Cl.
CPC ......... *G06Q 20/3829* (2013.01); *G06F 16/22* (2019.01); *G06F 21/33* (2013.01); *G06Q 20/102* (2013.01); *G06Q 20/401* (2013.01); *G06Q 20/4014* (2013.01); *G06Q 2220/00* (2013.01)

(58) Field of Classification Search
CPC ........................................................ H04L 9/00
See application file for complete search history.

(56) References Cited

U.S. PATENT DOCUMENTS

2016/0342994 A1*  11/2016  Davis ................. G06Q 20/4014
2017/0180128 A1*  6/2017   Lu ......................... H04L 9/3247

OTHER PUBLICATIONS

Guy Zyskind, Oz Nathan, Alex 'Sandy' Pentland, Decentralizing Privacy: Using Blockchain to Protect Personal Data, 2015, IEEE CS Security and Privacy Workshops, 181 (Year: 2015).*

* cited by examiner

*Primary Examiner* — Mamon Obeid
*Assistant Examiner* — Zehra Raza
(74) *Attorney, Agent, or Firm* — Xsensus LLP

(57) ABSTRACT

A method for using authentication information is provided. The method includes steps of: (a) a managing server, if a request for using the authentication information is acquired, acquiring a transaction ID corresponding to a specific user's identification information; (b) the managing server acquiring an output of a specific transaction corresponding to the transaction ID from a blockchain; (c) the managing server determining revocation of the authentication information by referring to the output of the specific transaction; and (d) the managing server supporting a communication by providing the specific user's public key in the output of the specific transaction, if the authentication information is not revoked, and if (i) a hash value of the specific user's identification information included in the output of the specific transaction or its processed value corresponds to (ii) a hash value of the specific user's identification information pre-stored in a certain database or its processed value.

20 Claims, 17 Drawing Sheets

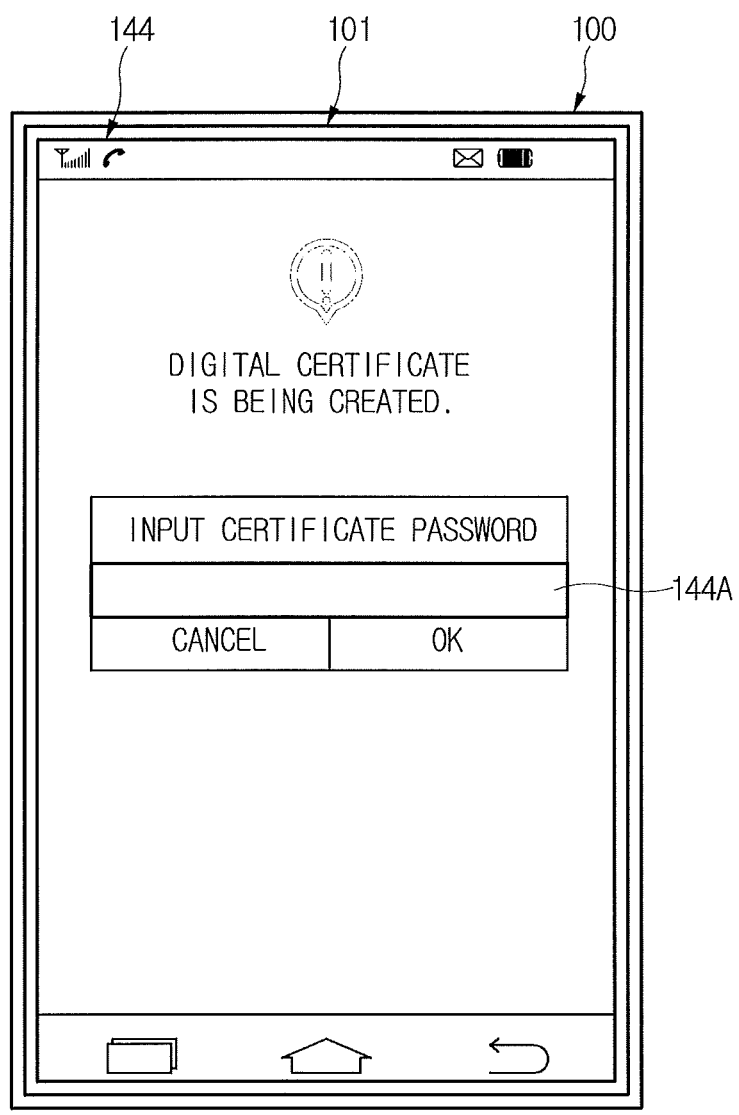

METHOD FOR USING AND REVOKING AUTHENTICATION INFORMATION AND BLOCKCHAIN-BASED SERVER USING THE SAME

CROSS REFERENCE TO RELATED APPLICATION

This application claims priority to and incorporates herein by reference all disclosure in Korean patent application no. 10-2016-0059851 filed May 16, 2016.

FIELD OF THE INVENTION

The present invention relates to a method for using and revoking authentication information and a blockchain-based server for managing the authentication information, and more particularly, to (1) the method for performing an auth info using process of acquiring a transaction ID corresponding to a specific user's identification information if a request for using the authentication information is acquired, acquiring an output of a specific transaction corresponding to the transaction ID from a blockchain, determining whether the authentication information is revoked by referring to the output of the specific transaction, and providing the specific user's public key included in the output of the specific transaction if the authentication information is determined to be not revoked and if (i) a hash value of the specific user's identification information included in the output of the specific transaction or its processed value corresponds to (ii) a hash value of the specific user's identification information pre-stored in a certain database or its processed value; and (2) the method for performing an auth info revoking process of extracting a transaction ID by referring to a signal for requesting revocation of the authentication information, acquiring an output of a specific transaction corresponding to the transaction ID from a blockchain, creating and transmitting to the blockchain a transaction for the revocation by referring to at least some of the output, and acquiring the transaction ID representing location information of the transaction for the revocation recorded on the blockchain.

BACKGROUND OF THE INVENTION

Thanks to development of IT, a variety of services based on the Internet may be used by people of all ages regardless of places.

In other words, various services in a diversity of industrial fields including financial services such as a wire transfer or stock trading by accessing servers operated by banks or securities firms, civil services such as issuing copies of resident registration and other various certificates by accessing servers operated by governmental bodies, and e-commerce services for purchasing goods by accessing servers for selling goods can be provided in real time through the Internet.

Meanwhile, to use services in such various industrial fields, authentications verifying identities of users, as customers, are performed at which time digital certificates are used.

Herein, a digital certificate is electronic information issued by a certification authority (CA) for the purpose of confirming an identity of a user and preventing transaction denials or forgery and falsification of a document upon the use of services in the various industrial fields, representing a kind of certificate of seal impression for a digital transaction. Such a digital certificate contains a version, a serial number, an effective period, an issuing institution of the certificate, information on verification of an e-signature of a user, a user's name, information on identification confirmation, an e-signature method, etc.

The digital certificate is used in a public key infrastructure (PKI) as a standard security method.

The public key infrastructure (PKI) is a set of roles, policies, and procedures needed to create, manage, distribute, use, store, and revoke digital certificates and manage public key encryption.

As a user's private key exists in a form of a file at a storing location standardized by a soft token-based storing method in the PKI, it is easy to copy and automatically collect a file of the private key and this causes risks of financial damage and user information theft caused by a leaked private key.

Since, for this reason, the CA must implement a digital certificate issuing system connected with an advanced security system to reduce a possibility of any hacking and perform the operation and maintenance of the implemented digital certificate issuing system, there has been a problem of incurring a lot of costs of issuing the digital certificate.

Besides, when a user authentication process is performed through a web browser, an ActiveX control must be installed in advance for security.

As such, the ActiveX control compulsorily installed during the process of user authentication is a technology that is created by Microsoft and is used to develop reusable object-oriented software components. By applying component object models and object linking and embedding (OLE), it is used to make contents downloadable from world-wide web (WWW). Most ActiveX controls are used to make plugins for Internet Explorer (IE).

To install the ActiveX controls on a personal computer (PC), a security level of the PC must be lowered for the ActiveX controls to access resources including files, registry, etc. Due to the lowered security level of the user's PC caused by the Active X controls required for security during the process of user authentication through the digital certificate, the PC becomes vulnerable to the dangerous environment such as hacking and the process of performing public certification also becomes complicated.

For these reasons, the South Korean government is executing a policy of removing Active X controls. In 2015, the South Korean President pointed out Active X controls as representative of the typical outdated regulations at the New Year's press conference to domestic and foreign reporters and journalists.

Furthermore, the digital certificates which require the installation of the Active X controls essential for security during the process of public certification can be used only with the IE provided by Microsoft but not with any other web browser such as Chrome, Safari, and Firefox.

In short, when users intend to use digital certificates for user authentication during the use of services in a variety of industrial fields including financial services, civil services, and e-commerce services as mentioned above, the users of the IE which supports the ActiveX controls may use the services but the users of other web browsers that do not support them are restricted in using the services.

In addition, as the current authentication procedures are conducted only by confirming the existence of the digital certificates and the correctness of passwords, the environment of using the digital certificates is prone to thefts of the certificates and the passwords.

As such, the digital certificates currently used have problems of lowered security, high costs for issuing and limitations in use. Therefore, a lower-cost technique with stronger security and more effective usability which may replace the existing digital certificates is required.

SUMMARY OF THE INVENTION

It is an object of the present invention to solve all the problems of the existing technologies.

It is another object of the present invention to provide a lower-cost technique with stronger security and more effective usability that may replace the existing digital certificate.

It is still another object of the present invention to provide a system for using authentication information, i.e., an authentication information using system, by allowing a specific user's public key included in an output of a specific transaction in a blockchain to be used if a hash value of the specific user's identification information included in the output of the specific transaction or its processed value corresponds to a hash value of the specific user's identification information pre-stored in a certain database or its processed value.

It is still yet another object of the present invention to provide the authentication information using system based on a blockchain, which monitor user authenticity without incurring costs of operating, and maintaining the authentication information using system connected with an advanced security system to reduce a possibility of hacking by storing and managing a public key which requires maintenance not in a server operated by a certificate authority (CA) but in an e-wallet embedded in blockchain servers through a distributed database based on a peer-to-peer (P2P) network.

It is still yet another object of the present invention to provide the authentication information using system, which are more tolerant of a malicious threat such as hacking thanks to a process of maintaining a security level of a PC at a desired level by an authentication without installation of ActiveX controls, and which have a simple authentication process and are compatible with various web browsers.

In accordance with one aspect of the present invention, there is provided a method for using authentication information, including steps of: (a) a managing server, if a request for using the authentication information is acquired, acquiring a transaction ID corresponding to a specific user's identification information; (b) the managing server acquiring an output of a specific transaction corresponding to the transaction ID from a blockchain; (c) the managing server determining whether or not the authentication information is revoked by referring to the output of the specific transaction; and (d) the managing server allowing the specific user's public key included in the output of the specific transaction to be used, if the authentication information is determined to be not revoked, and if (i) a hash value of the specific user's identification information included in the output of the specific transaction or its processed value corresponds to (ii) a hash value of the specific user's identification information pre-stored in a certain database or its processed value.

In accordance with another aspect of the present invention, there is provided a method for revoking authentication information, including steps of: (a) a managing server, if a signal for requesting revocation of the authentication information is acquired, extracting a transaction ID by referring to the signal; (b) the managing server acquiring an output of a specific transaction corresponding to the transaction ID from a blockchain; (c) the managing server creating and transmitting to the blockchain a transaction for the revocation by referring to at least some of the output; and (d) the managing server acquiring the transaction ID representing location information of the transaction for the revocation recorded on the blockchain.

In accordance with still another aspect of the present invention, there is provided a managing server supporting the use of authentication information, including: a processor, if a request for using the authentication information is acquired, for acquiring a transaction ID corresponding to a specific user's identification information; a communication part for acquiring an output of a specific transaction corresponding to the transaction ID from a blockchain; wherein the processor determines whether or not the authentication information is revoked by referring to the output of the specific transaction; and supports a communication by providing the specific user's public key included in the output of the specific transaction, if the authentication information is determined to be not revoked, and if (i) a hash value of the specific user's identification information included in the output of the specific transaction or its processed value corresponds to (ii) a hash value of the specific user's identification information pre-stored in a certain database or its processed value.

In accordance with still yet another aspect of the present invention, there is provided a managing server for supporting a revocation of authentication information, including: a communication part for acquiring a signal for requesting the revocation of the authentication information; and a processor for extracting a transaction ID by referring to the signal if the signal is acquired and for acquiring an output of a specific transaction corresponding to the transaction ID from a blockchain; wherein the communication part creates and transmits to the blockchain a transaction for the revocation by referring to at least some of the output and acquires the transaction ID representing location information of the transaction for the revocation recorded on the blockchain.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art:

FIGS. 5A-5H are drawings representing screens for guiding a generation of a key, which displays the process of issuing public and private keys in the user device by using the authentication information issuing system in accordance with the present invention.

DETAILED DESCRIPTION OF THE PREFERRED EMBODIMENTS

Figure 1:
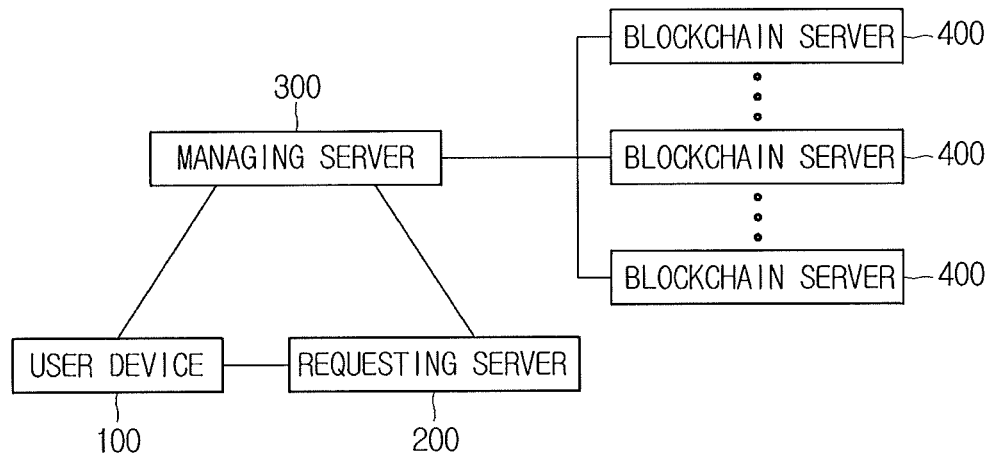
FIG. 1 is a block diagram illustrating an authentication information issuing system based on a blockchain in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention is largely divided into a first half part of issuing blockchain-based authentication information and a second half part of using the authentication information.

Figure 2:
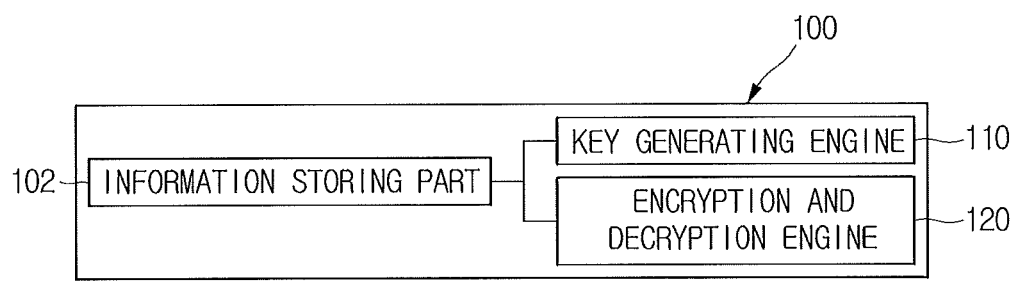
FIG. 2 is a block diagram representing a detailed configuration of a user device included in the authentication information issuing system in accordance with the present invention.
Figure 3:
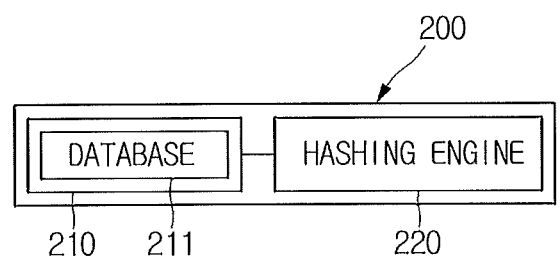
FIG. 3 is a block diagram showing a detailed configuration of a requesting server for requesting an issuance of the authentication information included in the authentication information issuing system in accordance with the present invention.
Figure 4:
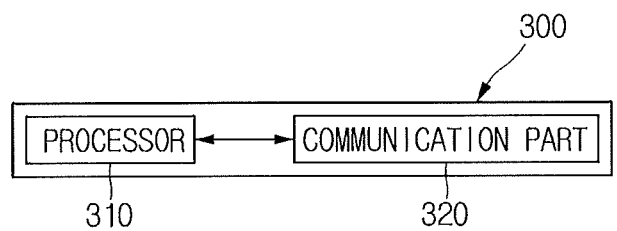
FIG. 4 is a block diagram illustrating a detailed configuration of a managing server included in the authentication information issuing system in accordance with the present invention.
Figure 5A:
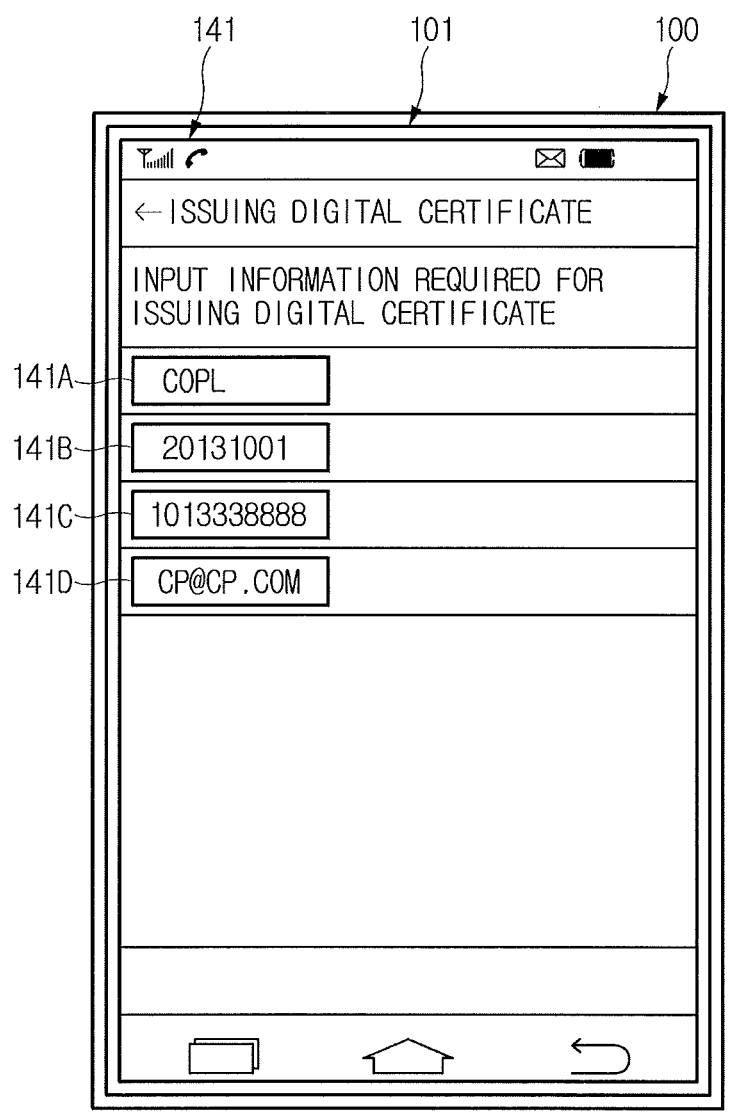
Figure 5B:
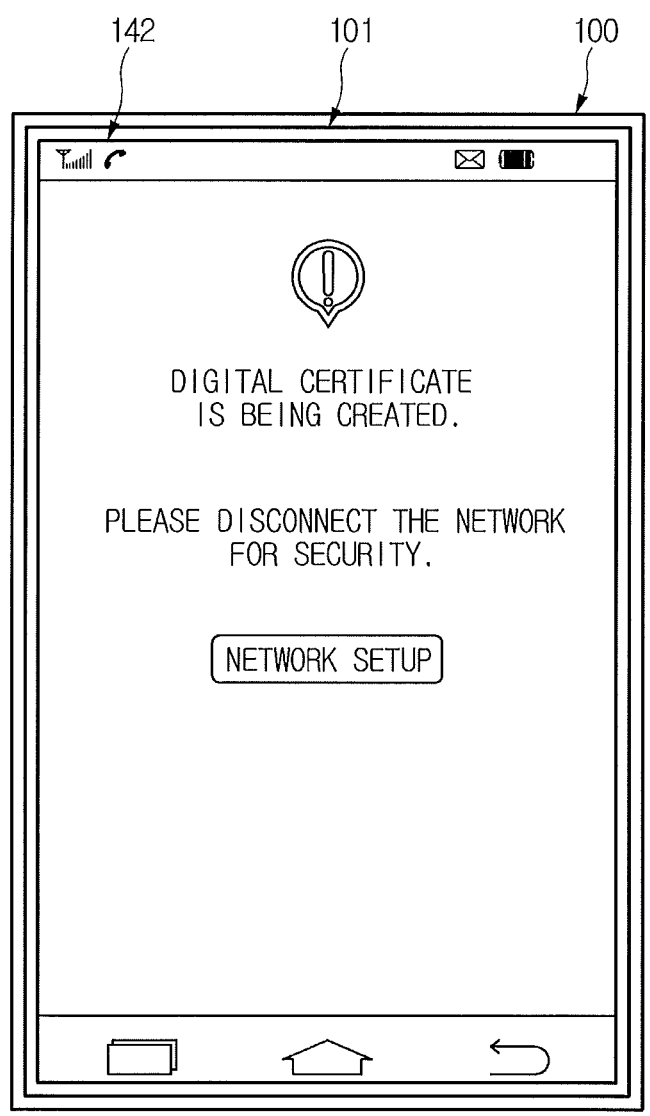
Figure 5C:
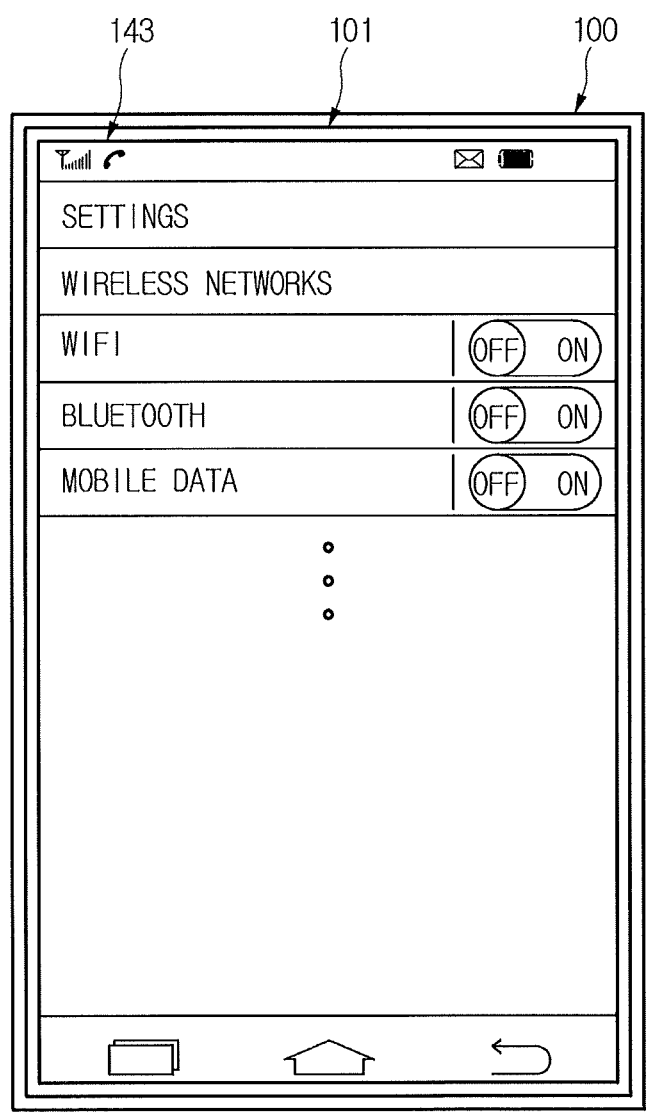
Figure 5E:
Figure 5F:
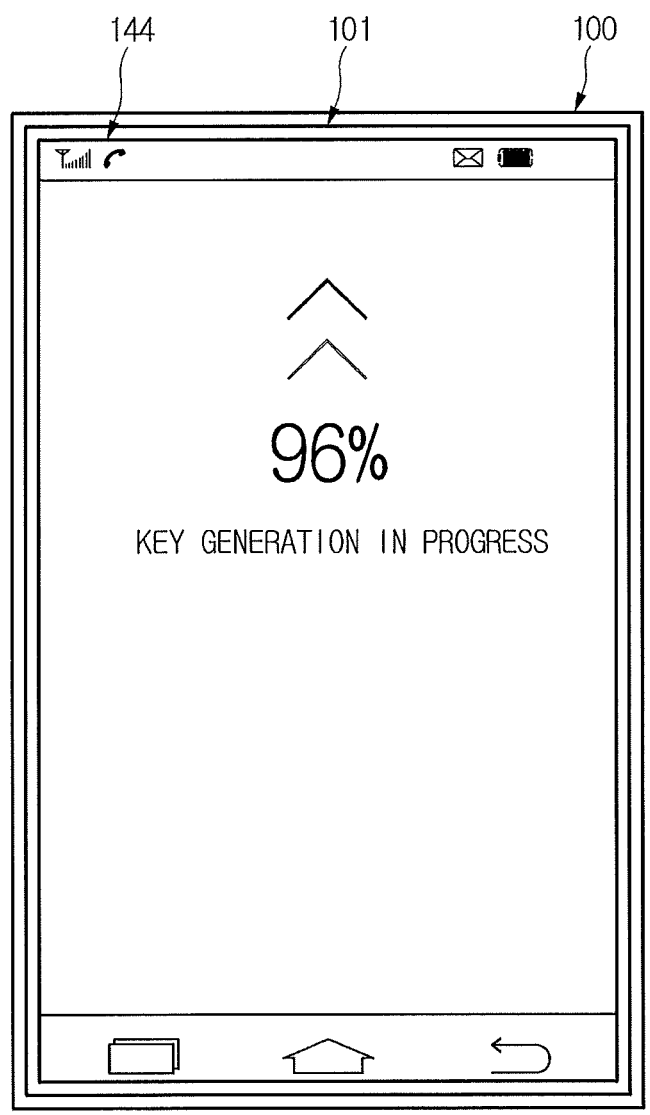
Figure 5G:
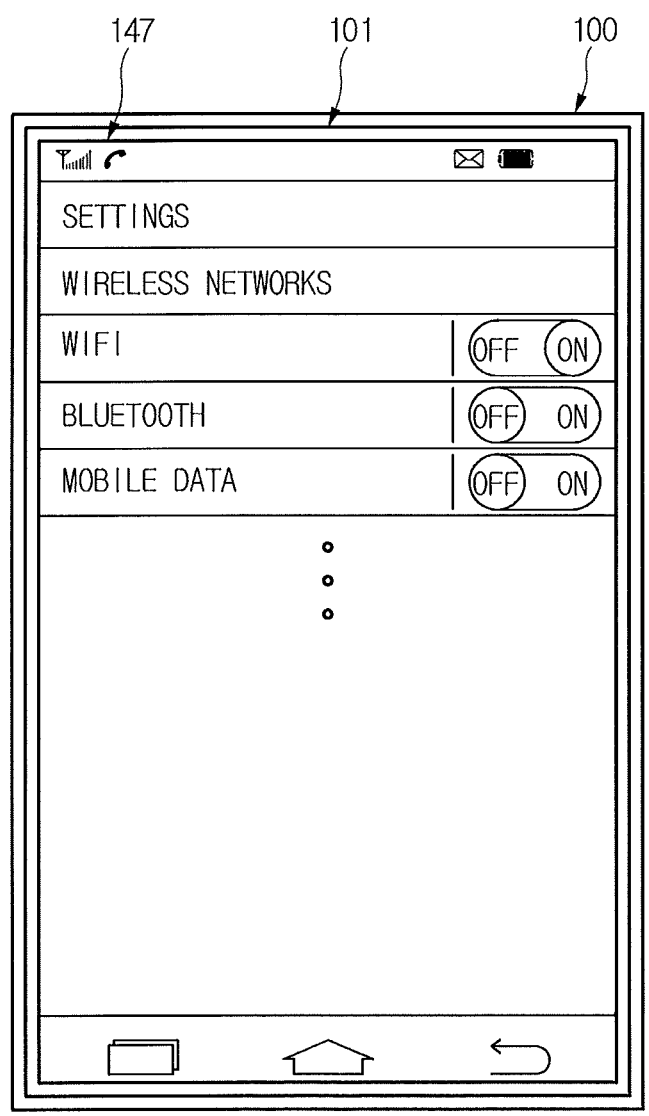
Figure 5H:

Herein, FIGS. 1 to 5H are related to an authentication information issuing system and an authentication information issuing method as the first half part of issuing the blockchain-based authentication information.

As illustrated in the drawings, in accordance with the present invention, the authentication information issuing system based on the blockchain may include a user device 100, a requesting server 200 for requesting an issuance of authentication information, a managing server 300 for managing authentication information, and a blockchain server 400.

First of all, the user device 100 is a device which generates public and private keys and transmits to the requesting server 200 a public key among the generated keys and personal information for issuing the blockchain-based authentication information comprised of a user's identification information as explained below. Herein, the personal information for issuing the blockchain-based authentication information may include at least some of the user's name, birth date, telephone number and email address.

To perform such functions, the user device 100 may include an information displaying part 101, an information storing part 102 where data, application programs, etc. are stored, an information entering part (not illustrated) for producing a user's input signal, and a controlling part (not illustrated) for performing a control of the user device 100, a key generating engine 110, and an encryption and decryption engine 120.

Herein, the key generating engine 110, the encryption and decryption engine 120 and a screen for notifying a generation of a key to be explained later, etc. may be installed in a form of an application program if the user device 100 is in a form of a desktop such as a personal computer (PC), and installed in a form of a mobile exclusive app if the user device 100 is a mobile device such as a smartphone which may be connected with the Internet.

Before generating the public and private keys, the user device 100 may perform a process of confirming that the user device 100 has registered the user's identification information on the requesting server 200.

To do this, the requesting server 200 to be explained later includes a database 210, where the identification information of the user is stored, having a database 211 where the personal information for issuing blockchain-based authentication information is stored.

The user device 100 may transmit the personal information for issuing blockchain-based authentication information to the requesting server 200 to thereby request an issuance of the authentication information. If there is any data retrieved from the database 211 which matches the transmitted personal information for issuing blockchain-based authentication information, the requesting server 200 may transmit a notifying signal for notifying a fact that the public and private keys are generated to the user device 100. If no personal information is retrieved from the database, the requesting server 200 may transmit a message representing that authentication information cannot be issued.

More specifically, if a specific user's identification information is acquired in response to a request for issuing the authentication information from the user device 100 and if the identification information is confirmed by the requesting server 200 to be registered, the requesting server 200 may create the notifying signal and support the user device 100 to generate the specific user's public and private keys.

If the notifying signal is transmitted from the requesting server 200, the user device 100 may instruct the key generating engine 110 to create the public and private keys. Herein, the user device 100 prevents possible leak of the public and private keys in advance by generating the public and private keys while blocking a network connection.

If the notifying signal is transmitted, the user device 100 displays a notice screen 142 showing that the network connection is being blocked.

If the user clicks a menu for requesting a setup of the network after reading the displayed screen 142, the user device 100 displays a screen 143 indicating blocking of the network. Thereafter, the user may sever the network through UI provided on the displayed screen 143.

Further, by using the encryption and decryption engine 120, the user device 100 encrypts a private key based on a password and an image designated by the user and stores the encrypted private key in the information storing part 102.

If the user device 100 displays a screen 144 for entering a password, the user may enter the password in a password input field 144A of the screen 144 and then click OK.

Similarly, the user device 100 displays a screen 145 for selecting an image. The user may select a desired image among multiple images displayed on the screen 145.

The user device 100 instructs the key generating engine 110 to generate the public and private keys. Herein, the user device 100 displays a notifying screen 146 for generating a key to inform the user that the public and private keys are generated.

Thereafter, if the public and private keys are generated, the user device 100 instructs the encryption and decryption engine 120 to encrypt the private key based on the password and the image designated by the user and stores the encrypted private key.

Since it is difficult in effect to infer the password and the image designated by the user, a risk of information theft is minimized even if the user's private key is leaked out.

Besides, a screen for displaying a course of issuing the public and private keys is stored in the information storing part 102 of the user device 100.

If the encrypted private key is stored, the user device 100 displays a message for inducing the user to reconnect the network and then the user may reconnect the network.

The user device 100 displays a screen 147 for providing information on a state of connection to inform the user that the network is connected again.

The screen for displaying a course of issuing the public and private key includes: a screen 141 for entering user identification information having a username input field 141A where a name of the user is entered, a user birth date field 141B where the birth date of the user is entered, a user telephone number field 141C where the telephone number of the user is entered, and a user email field 141D where the email address of the user is entered; the screen 142 for notifying that the network connected with the user device 100 is to be disconnected before the generation of the public and private keys; the screen 143 for notifying disconnection of the network with the user device 100; the screen 144 for entering a password including a password field 144A where the password required to issue the authentication information is entered; the screen 145 for allowing the user to select an image among multiple images; the screen 146 for notifying the generation of the public and private keys; the screen 147 for displaying a state of network connection that represents the blocked network is connected again after the public and private keys were generated; and a screen 148 for representing a state of completion of the issuance of the authentication information.

The requesting server 200 may receive the public key and the personal information for issuing blockchain-based authentication information from the user device 100, hash the personal information for issuing blockchain-based authentication information to thereby acquire user identification hash information, create a REQ signal of requesting for creating a transaction by using the user identification hash information, the public key, and user identification information, and transmitting the REQ signal to the managing server 300 as explained below. A processor 310 as explained below may perform operations of creating and transmitting the transaction depending on whether or not the user's identification information is registered. Herein, the user identification information may utilize the user's telephone number, particularly, the user's mobile phone number. To perform such functions, a hashing engine 220 may be included in the requesting server 200.

The hashing engine 220 installed in the requesting server 200 performs a function of hashing the personal information for issuing the blockchain-based authentication information to thereby acquire the user identification hash information.

If the user's identification information is acquired from the user device 100 in response to a request for issuing the authentication information and if the identification information is confirmed to be registered, the managing server 300 creates a transaction whose output includes (i) the user's public key and (ii) a hash value of the identification information or its processed value and records or supports other device to record it on the blockchain, and then acquires a transaction ID representing location information of the transaction recorded on the blockchain. The managing server 300 may store and manage the transaction ID.

To perform such functions, the managing server 300 includes the processor 310 and a communication part 320.

If the specific user's identification information is acquired from the user device 100 in response to a request for issuing the authentication information and if the specific user's identification information is confirmed to be registered, the processor 310 may create a transaction whose output includes (i) the specific user's public key and (ii) a hash value of the specific user's identification information or its processed value and records or supports other device to record it on the blockchain. The specific user's identification information may be retrieved from a database.

More specifically, the processor 310 may create the transaction whose output includes (i) the specific user's public key, (ii) the hash value of the specific user's identification information or its processed value, and (iii) information on a certain amount of a cost deposit against revocation required to revoke the authentication information to thereby record or support other device to record it on the blockchain. The information on the cost deposit against revocation includes a virtual currency used to revoke the authentication information. Herein, if at least some amount of the virtual currency used to revoke the authentication information is transferred to a certain address, it may represent that the authentication information is revoked.

The communication part 320 acquires a transaction ID representing information on a location of the transaction recorded on the blockchain.

Meanwhile, the processor 310 may hash the user identification hash information and the transaction ID to thereby acquire hash information for user verification.

The managing server 300, which performs the above-described functions, may be a server of a company which requires authentication upon using a service, including servers operated by banks or securities firms, governmental bodies, or shopping malls doing e-commerce business.

The transaction recorded on the blockchain included in an e-wallet of the blockchain server 400 as explained below may include: information on a previous transaction ID for bitcoin payment used to identify a storing location of bitcoins to be used by a remitter through information on a previous transaction for the bitcoin payment, information on an authority of the remitter to use bitcoins, information on a public key for the bitcoin payment required to determine a validity of the authority to use bitcoins, the hash information for user verification, and OP_RETURN information used to represent that it is not a bitcoin transaction but a meta transaction for recording information.

Herein, the information on the previous transaction ID for bitcoin payment is information used as a key value to search for the previous transaction for bitcoin payment. The information on the authority to use bitcoins is information on a digital signature of the remitter, where the remitter corresponds to a user who remitted bitcoins in the previous transaction.

Moreover, a data structure of the transaction is divided into input data ID and output data OD. The information on the previous transaction ID for bitcoin payment, the information on the authority of the remitter to use bitcoins and the public key for bitcoin payment may be separately stored in the input data ID while OP_DUP information, information on an amount of bitcoins, and collector identification information may be separately stored in the output data OD. Herein, the OP_DUP information is information representing that it is a transaction for a bitcoin business transaction.

In addition, the transaction may further include information on a cost of registering the specific user's public key and the hash information for user verification necessary to issue the authentication information.

Herein, the data structure of the transaction is also divided into input data ID1 and output data OD1. The previous transaction ID for bitcoin payment, the information on the authority of the remitter to use bitcoins, the public key for bitcoin payment, and the information on the cost of registering the public key may be separately stored in the ID1 and the OP_RETURN information and the public key may be separately stored in the OD1.

Herein, the information on the cost of registering the public key means a cost paid to a miner involved in registering the transaction on the blockchain included in the e-wallets of the blockchain servers 400, which roughly costs 0.0001 bitcoin.

In addition, 0.0001 bitcoin, as of July 2015, amounts to 3 cents, which is very cheap. The total costs to issue a bitcoins-based digital certificate amount to less than 10 cents.

Besides, the transaction may further include information on the bitcoin address of the cost deposit against revocation to be used for a transfer to a designated bitcoin address and information on the transfer of the cost deposit against revocation which includes an amount thereof.

The blockchain servers 400 are devices forming a bitcoin network that performs bitcoin payment by authenticating and recording of the bitcoin payment.

When the issuance of the authentication information is completed, the communication part 320 may notify the user device 100 of the completion of the issuance. The user device 100 may display the informing screen 148 for completing the issuance of the authentication information to notify the user.

Herein, brief explanation on bitcoins will be given. Bitcoin is a form of digital currency created in 2009 payable for goods by Satoshi Nakamoto with a structure where there is no central device that issues and manages the currency. Instead, a bitcoin transaction is made by a P2P-based distributed database and is performed based on a public-key cryptography.

The bitcoin with such a payment method is usable without a need for information on a credit card number, an expiration date, and a card verification value (CVV) number upon payment with a credit card and even has a low fee. In addition, the bitcoins are stored in the e-wallets in a form of a file to which individual unique addresses, i.e., public addresses, are allocated and the bitcoin transactions are made based on the addresses.

To use the bitcoins with such payment characteristics, first of all, users need to join the bitcoin exchange (e.g.: www.coinplug.com), open e-wallets, and then purchase bitcoins.

After confirming the current price of the bitcoin traded at the bitcoin exchange, when the users place purchase orders by entering the number and unit price of bitcoins they want and the transactions are established through the sell orders satisfying transaction conditions, the users may perform payment through bitcoins upon the purchase of the goods.

As mentioned above, a server operated by the bitcoin exchange may be included in the blockchain servers 400.

To do so, the individual blockchain servers 400 must have e-wallets with the blockchain. In general, if information on a transaction for bitcoin payment created from normal bitcoin payment is received by the blockchain, the bitcoin payment is authenticated through verification of the received transaction information and the information on the transaction for the bitcoin payment is recorded on the blockchain according to the authentication and is broadcasted to designated blockchain servers 400.

In other words, the broadcast of the information on the transaction for bitcoin payment is agreed upon a communication protocol. Upon occurrence of transaction information on bitcoin payment, the bitcoin payment is completed when the transaction information is broadcasted to all the blockchain servers 400 that have the e-wallets with blockchain necessary to perform the bitcoin payment through a repeated pyramid-type broadcasting method where one node, referred to as a blockchain server, broadcasts the information to, e.g., eight designated nodes and the individual eight nodes that have received the information again broadcast the information to, e.g., individually designated eight other nodes.

As such, no transactions recorded on the blockchain can be falsified or altered afterward.

Meanwhile, a server or a terminal operated by a bitcoin miner or even a user device for bitcoin payment, such as a PC or a smartphone, may be included in the blockchain servers 400 that have the e-wallets with the blockchain.

Moreover, the bitcoin payment is performed based on the e-wallets with the blockchain. As such, payment based on the e-wallets with blockchain may be performed with Lightcoins, Darkcoins, Namecoins, Dogecoins, Ripples, etc. These virtual currencies are available as substitutes for bitcoins that may be used to verify falsification or alteration of all certificates or documents issued by financial institutions, in accordance with the present invention.

In addition, not only information on a transaction for normal bitcoin payment but also personal information as stated above may be recorded on the blockchain of the blockchain servers 400.

In short, if transaction information, i.e., information on a transaction occurring upon bitcoin payment, is transmitted with OP_RETURN (Operation Code RETURN) information included, the e-wallets of the individual blockchain servers 400 may treat the transaction information as private information which is not for normal bitcoin payment and broadcast it. Since the OP_RETURN information may be recorded in the transaction information to verify all certificates, the transaction information may be utilized as important components for verification of falsification or alteration of digital contents.

Herein, if a message of OP Return is recognized from the information on the transaction for bitcoin payment upon authentication of the bitcoin payment with the e-wallets of the blockchain servers 400, the OP_RETURN information is used to cause a user to perceive that the message is an 80-byte-long value of arbitrary data which is not bitcoin transaction information.

Below will be explanation on a system for using the authentication information that provides a method for using the blockchain-based authentication information.

Figure 6:
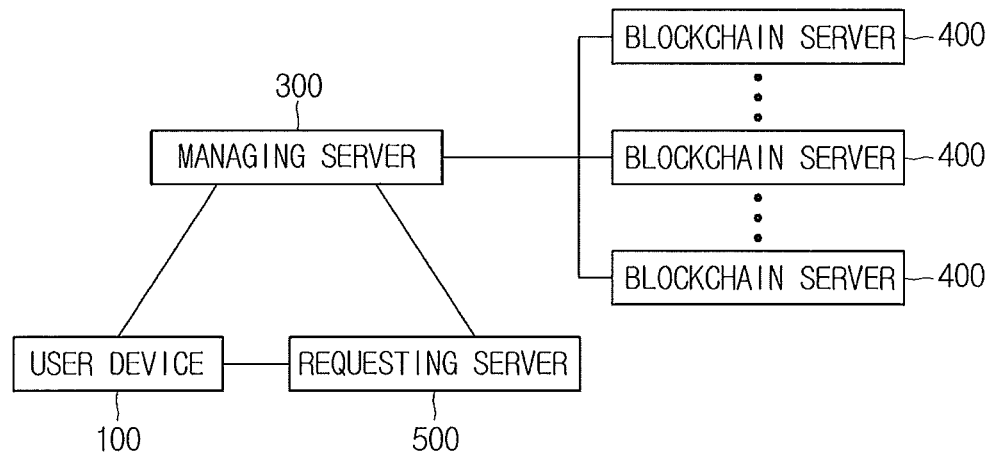
FIG. 6 is a block diagram illustrating an authentication information using system in accordance with the present invention.
Figure 7:
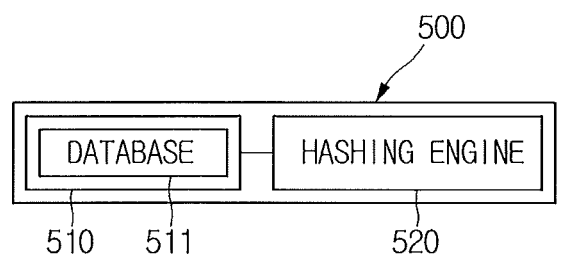
FIG. 7 is a block diagram illustrating a detailed configuration of an INFO_REQ server for requesting the authentication information included in the authentication information using system in accordance with the present invention.
Figure 8:
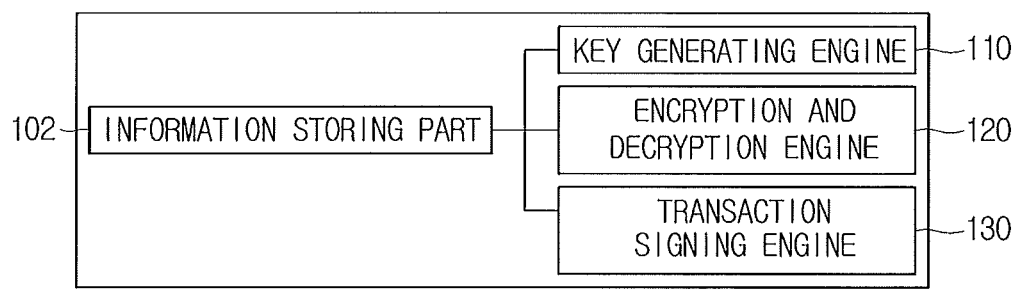
FIG. 8 is a block diagram illustrating a detailed configuration of the user device included in the authentication information using system in accordance with the present invention.
Figure 9A:
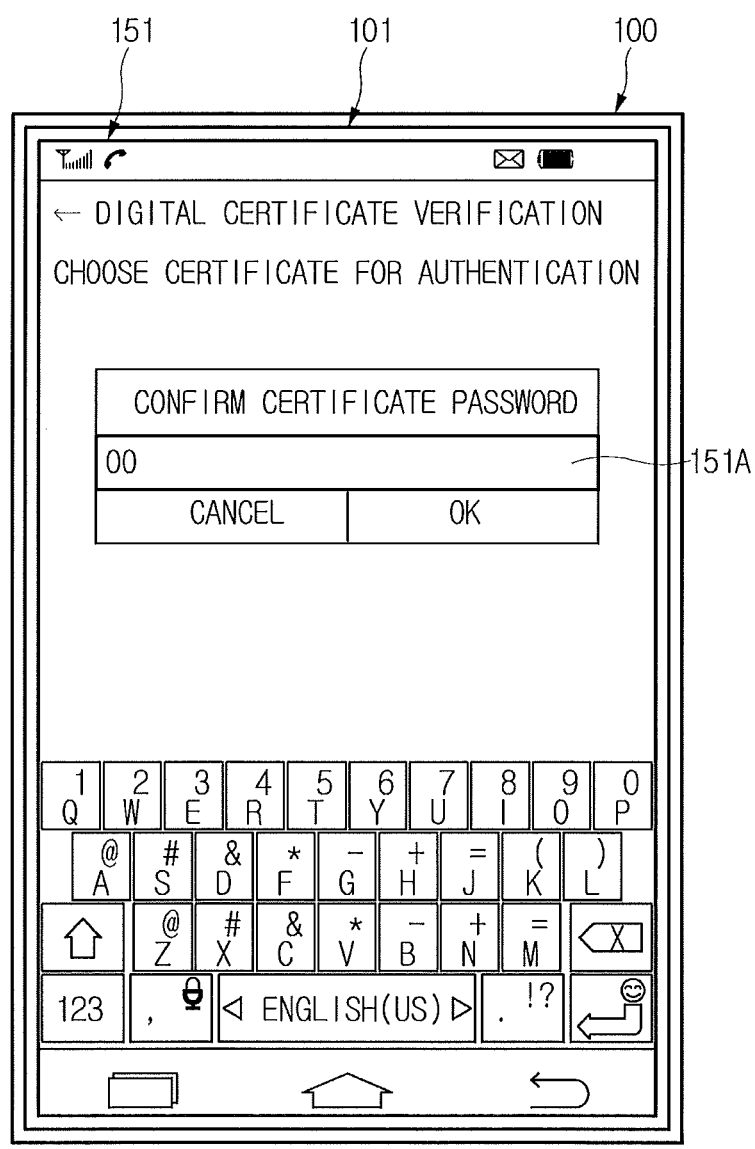
FIGS. 9A and 9B are drawings showing user authentication screens of the user device that display a course of selecting a password and an image designated by a user in the user device by utilizing the authentication information using system in accordance with the present invention.
Figure 9B:
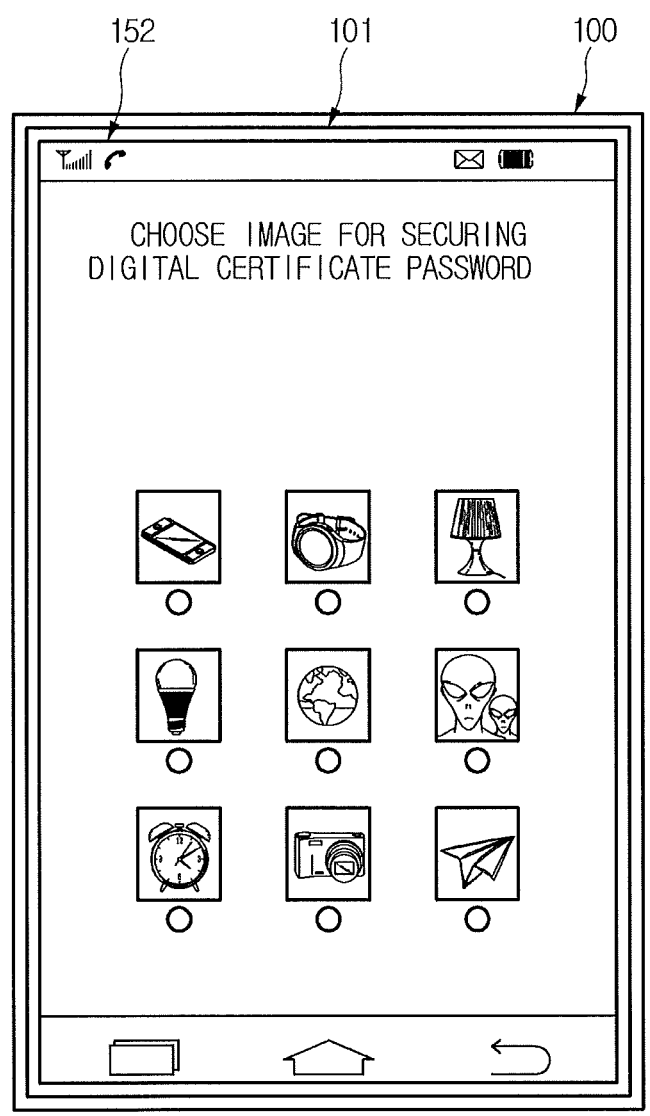

FIGS. 6 to 9B relate to a system and a method for using the blockchain-based authentication information. Explanation on FIGS. 6 to 9B may be omitted if it is similar to that on the embodiment for issuing the authentication information.

As illustrated in the drawings, an authentication information using system in accordance with the present invention includes the user device 100, an INFO_REQ server 500, a managing server 300 and the blockchain servers 400.

First of all, the user device 100 may request the use of the blockchain-based authentication information.

The INFO_REQ server 500 is a server for relaying a request of the user device 100 for using the authentication information by transmitting the specific user's identification information who operates the user device 100.

For this, the INFO_REQ server 500 includes a database 510, where the identification information of the user who operates the user device 100 is stored. Herein, the database 510 has a database 511 in which the user identification information used upon the issuance of the authentication information and the specific user's identification information are recorded.

The INFO_REQ server 500 retrieves the specific user's identification information from the database 511 in response to a request for using the authentication information from the user device 100 and transmits the retrieved information to the managing server 300.

If the request for using the authentication information is acquired, the managing server 300 acquires a transaction ID corresponding to the user's identification information and an output of a specific transaction corresponding to the transaction ID from the blockchain by referring to the transaction ID. Thereafter, by referring to the output of the specific transaction, the managing server 300 determines whether or not the authentication information is revoked and if the authentication information is determined to be not revoked and if (i) a hash value of the user's identification information included in the output of the specific transaction or its processed value corresponds to (ii) a hash value of the specific user's identification information pre-stored in a certain database or its processed value, the managing server 300 may provide or allow the user's public key included in the output of the specific transaction to be used.

In detailed explanation, if the request for using the authentication information is acquired, the processor 310 may acquire a transaction ID corresponding to the user's identification information. The transaction ID may be stored and managed in a local database.

By referring to the transaction ID, the communication part 320 may acquire an output of the specific transaction corresponding to the transaction ID from the blockchain.

By referring to the output of the specific transaction, the processor 310 determines whether or not the the authentication information is revoked. If the authentication information is determined to be not revoked, and if (i) a hash value of the user's identification information included in the output of the specific transaction or its processed value corresponds to (ii) a hash value of the user's identification information pre-stored in a certain database or its processed value, the processor 310 may provide or allow the user's public key included in the output of the specific transaction to be used.

Upon determining the revocation of the authentication information, the communication part 320 may transmit to the blockchain a signal for confirming whether or not a cost deposit against revocation of authentication information that corresponds to an amount of bitcoins provided to a bitcoin address thereof included in the output of the specific transaction is transferred and may receive a signal for confirming whether or not the cost deposit against revocation provided to the bitcoin address is transferred.

If the cost deposit against revocation of authentication information provided to the bitcoin address is determined to be transferred by referring to the instructing signal, the processor 310 may determine the authentication information to be revoked and allow the user device 100 to be notified that the authentication information is revoked.

The certain database may be a database managed by the INFO_REQ server 500. In addition, the certain database may include personal information for issuing the authentication information comprised of users' identification information which was used for the issuance, and the specific user's identification information.

By referring to a particular database, the processor 310 may acquire a transaction ID corresponding to the user's identification information. The particular database may include multiple users' personal information having the specific user's identification information and information on the transaction ID used as a key value to retrieve a transaction. In this case, the processor 310 may retrieve the information on the transaction ID from the particular database by using the specific user's identification information and may retrieve the user's public key and the hash value of the specific user's identification information or its processed value from the transaction information.

The user device 100 may perform authentication based on the provided public key.

For this, the user device 100 may include the information storing part 102 where the private key encrypted based on the password and the image set by the user is stored and the encryption and decryption engine 120.

In addition, the INFO_REQ server 500 may assist in transmission of the encrypted public key for authentication information, which is encrypted based on a message for requesting the user to input the password and the image.

If the encrypted public key for authentication information is transmitted, the user device 100 may display a screen 151 for allowing the user to enter a password for authentication. Then the user may enter the password registered upon the issuance in a password entering field 151A.

If the user device 100 displays a screen 152 for allowing the user to select an image for authentication, the user may select an image designated upon the issuance among multiple images.

Thereafter, the user device 100 may decrypt the encrypted private key for the authentication information stored in the information storing part 102 by referring to the password, the image, and the encrypted public key transmitted by the encryption and decryption engine 120 and, if the decryption is successful, may allow a signal for authenticating user identity to be transmitted to the INFO_REQ server 500.

If the authentication information is determined to be not revoked, and if (i) a hash value of the user's identification information included in the output of the specific transaction or its processed value corresponds to (ii) a hash value of the user's identification information stored in the certain database or its processed value, the processor 310 may create or support other server to create a nonce. Besides, if the nonce signed with the user's private key is acquired by providing the created nonce to the user, the processor 310 may verify or support other server to verify the signed nonce by using the user's public key.

Herein, if a result of the verification is determined to be a mismatch, the processor 310 may transmit a message representing that the user's private key does not match. If the result of the verification is determined to be a match, the processor 310 may support the communication between the user device 100 and an external device to be established.

Meanwhile, the managing server 300 may support the revocation of the issued authentication information.

If the communication part 320 acquires a signal for requesting revocation of the authentication information, the processor 310 may extract a transaction ID by referring to the signal and acquire an output of a specific transaction corresponding to the transaction ID from the blockchain by referring to the transaction ID.

The communication part 320 may create and transmit to the blockchain a transaction for revocation by referring to at least some of the output and may acquire the transaction ID representing location information of the transaction for revocation recorded on the blockchain.

The transaction for revocation may include (i) input data ID3 having guide information on a transfer of a cost deposit against revocation of authentication information, information on an authority to use bitcoins including an authority of a remitter or a user to use the cost deposit against revocation, and a public key for bitcoin payment required to determine a validity of the authority to use bitcoins and (ii) output data OD3 having a bitcoin address of a collector to which the cost deposit against revocation is remitted and the identification information on the collector.

In addition, (i) if the signal for requesting revocation of the authentication information is generated from the user device 100, the processor 310 may instruct the user device to digitally sign the transaction for revocation, and (ii) if the signal for requesting revocation of the authentication information is generated from the managing server 300 itself, the processor 310 may instruct the remitter to digitally sign the transaction for revocation and to thereby transmit the signed transaction for revocation to the blockchain.

The present invention has an effect of replacing existing digital certificates with stronger security and availability at lower costs.

Besides, the present invention has another effect of using authentication information by providing a specific user's public key included in an output of a specific transaction if a hash value of the specific user's identification information included in the output of the specific transaction or its processed value corresponds to a hash value of the user's identification information pre-stored in a certain database or its processed value.

The present invention also has an effect of monitoring user fraud without incurring any costs of implementing, operating, and maintaining a using system connected with an advanced security system to prevent +hacking as much as possible by using a means of a public key for authentication information required for maintenance not in a server operated by a certificate authority or CA but on a blockchain of e-wallets embedded in blockchain servers through a distributed database based on a peer-to-peer network or P2P.

The present invention has an effect of being more tolerant of a dangerous condition such as hacking thanks to a possibility to maintain a security grade of a PC through a means of leading an authentication course to be performed without installation of ActiveX controls, being easy to perform authentication, and being compatible with various web browsers.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method, comprising:
acquiring, by a managing server, a request for using authentication information, wherein the authentication information includes a public key of a user and the authentication information is used to secure a transaction related to a transaction identifier (ID) corresponding to identification information of the user, and wherein the request includes the identification information of the user transmitted from a requesting server;
acquiring, by the managing server, the transaction ID corresponding to the identification information of the user;
acquiring, by the managing server, an output of the transaction corresponding to the transaction ID from a blockchain, the output including a hash value of the identification information, a bitcoin address, and the public key of the user;
determining, by the managing server, whether or not the authentication information is revoked by referring to the output of the transaction;
in a case that the managing server determines that the authentication information is revoked:
  inquiring, by the managing server transmitting a requesting signal to the blockchain, whether or not a cost deposit against revocation of the authentication information corresponding to bitcoins deposited to the bitcoin address is transferred;
  confirming, by the managing server receiving an informing signal, whether or not the cost deposit against the revocation provided to the bitcoin address is transferred; and
  sending, by the managing server to a user device in a case that the informing signal indicates that the cost deposit against the revocation has been transferred, a message representing that the authentication information is revoked; and
in a case that the managing server determines that the authentication information is not revoked:
  determining, by the managing server, whether the acquired hash value of the identification information corresponds to a pre-stored hash value of the identification information that is pre-stored in a first database; and securing the transaction by providing, by the managing server to the requesting server in a case that the managing server determines that the acquired hash value corresponds to the pre-stored hash value, the public key of the user included in the output of the transaction from the blockchain, wherein the securing the transaction further includes transmitting, from the requesting server to the user device, the public key as an encrypted public key for the authentication information based on a user identity confirmation request capable of requesting the user to input a password and an image, to instruct the user device to (i) decrypt a pre-stored encrypted private key for the authentication information by referring to the password, the image, and the encrypted public key, and (ii) in a case that a decryption is successful, transmit a user identity confirmation signal to the requesting server.

2. The method of claim 1, wherein the transaction includes:

information on a previous transaction ID for bitcoin payment used to identify a storing location of bitcoins to be used among bitcoins held by the user through previous transaction information for bitcoin payment, information on an authority of the user to use the bitcoins, information on the public key for the bitcoin payment, hash information for user verification, and OP_RETURN information used to represent that the transaction is not a bitcoin transaction but a meta transaction for recording information.

3. The method of claim 2, wherein the transaction further includes:

information on a cost of registering the user's public key and the hash information for user verification, and information on the cost deposit against the revocation.

4. The method of claim 3, wherein the transaction further includes:

information on a bitcoin address of a cost deposit against the revocation to be used for a transfer to a designated bitcoin address, and information on the transfer of the cost deposit against the revocation.

5. The method of claim 1 further comprising managing, by the requesting server, the first database.

6. The method of claim 5, wherein the first database includes:

the identification information, which corresponds to personal information of the user which was used for issuance of the transaction.

7. The method of claim 1, wherein the acquiring the transaction ID is performed referring to a second database, the second database includes personal information of multiple users and having identification information of the multiple users and information on transaction IDs used as a key value to retrieve a transaction of the user, and the acquiring the transaction ID further comprises extracting information on the transaction ID by retrieving the identification information from the second database, and extracting the public key and the hash value of the identification information from transaction information corresponding to the extracted transaction ID.

8. The method of claim 1, further comprising in the case that the authentication information has not been revoked:

creating, by the managing server, a nonce;

acquiring, by the managing server, a value which is the nonce signed with the user's private key; and verifying, by the managing server, the value by using the user's public key.

9. The method of claim 8, further comprising:

determining a result of verification is a mismatch; and transmitting a message representing that the private key does not match.

10. The method of claim 8, further comprising:

determining a result of verification is a match; and establishing a communication between a user device and another device.

11. A system, comprising:

a user device connected to a managing server; and the managing server, comprising:

a processor configured to acquire a request for using authentication information and acquire a transaction identifier (ID) corresponding to identification information of a user, wherein the authentication information includes a public key of a user and the authentication information is used to secure a transaction related to the transaction ID, and wherein the request includes the identification information of the user transmitted from a requesting server; and a transceiver that acquires an output of the transaction corresponding to the transaction ID from a blockchain, the output including a hash value of the identification information, a bitcoin address, and the public key of the user, wherein the processor is further configured to:

determine whether or not the authentication information is revoked by referring to the output of the transaction;

in a case that the authentication information is determined to be revoked:

inquire, by controlling the transceiver to transmit a requesting signal to the blockchain, whether or not a cost deposit against revocation of the authentication information corresponding to bitcoins provided to the bitcoin address is transferred;

confirm, by the transceiver receiving an informing signal, whether or not the cost deposit against the revocation is transferred;

control the transceiver to send, to a user device in a case that the informing signal indicates that the cost deposit against the revocation has been transferred, a message representing that the authentication information is revoked; and in a case that the authentication information is determined to not be revoked:

determine whether the acquired hash value of the identification information corresponds to a pre-stored hash value of the identification information that is pre-stored in a first database; and secure the transaction by providing, to the requesting server in a case that the acquired hash value is determined to correspond to the pre-stored hash value, the public key of the user included in the output of the transaction from the blockchain, wherein to secure the transaction, the requesting server transmits the user device the public key as an encrypted public key for the authentication information based on a user identity confirmation request capable of requesting the user to input a password and an image, to instruct the user device to (i) decrypt a pre-stored encrypted private key for the authentication information by referring to the password, the image, and the encrypted public key, and (ii) in a case that a decryption is successful, transmit a user identity confirmation signal to the requesting server.

12. The system of claim 11, wherein the transaction includes:
information on a previous transaction ID for bitcoin payment used to identify a storing location of bitcoins to be used among bitcoins held by the user through previous transaction information for bitcoin payment,
information on an authority of the user to use the bitcoins,
information on the public key for the bitcoin payment,
hash information for user verification, and
OP_RETURN information used to represent that the transaction is not a bitcoin transaction but a meta transaction for recording information.

13. The system of claim 12, wherein the transaction further includes:
information on a cost of registering the user's public key and the hash information for user verification, and
information on the cost deposit against the revocation.

14. The system of claim 13, wherein the transaction further includes:
information on a bitcoin address of a cost deposit against the revocation to be used for a transfer to a designated bitcoin address, and
information on the transfer of the cost deposit against the revocation.

15. The system of claim 11, further comprising the requesting server that manages the first database.

16. The system of claim 15, wherein the first database includes:
the identification information, which corresponds to personal information of the user which was used for issuance of the transaction.

17. The system of claim 11, wherein
the processor acquires the transaction ID corresponding to the identification information by referring to a second database,
the second database includes personal information of multiple users and having identification information of the multiple users and information on transaction IDs used as a key value to retrieve a transaction of the user, and
the processor is further configured to acquire the transaction ID by extracting information on the transaction ID by retrieving the identification information from the second database, and extracting the public key and the hash value of the identification information from transaction information corresponding to the extracted transaction ID.

18. The system of claim 11, wherein in the case that the processor determines the authentication information has not been revoked, the processor is further configured to a value which is a nonce signed with the private key, and verify the value by using the public key.

19. The system of claim 18, wherein in a case that the processor determines a result of verification is a mismatch, the processor then transmits a message representing that the private key does not match.

20. The system of claim 18, wherein in a case that the processor determines a result of verification is a match, the processor establishes a communication between the user device and another device.

* * * * *